Dec. 10, 1968 J. M. BEVIS 3,415,435

CAPSTAN

Filed Jan. 30, 1967

INVENTOR.

JEFFREY M. BEVIS

BY Julius Louis Rubinstein

ATTORNEY 3,415,435
Patented Dec. 10, 1968

3,415,435

CAPSTAN

Jeffrey M. Bevis, Long Beach, Calif., assignor to Chalco Engineering Corporation, Gardena, Calif.

Filed Jan. 30, 1967, Ser. No. 612,437
11 Claims. (Cl. 226—102)

ABSTRACT OF THE DISCLOSURE

The low inertia capstan is a continuously rotating shaft connected to a suitable tape drive wheel through a slip clutch. When tape is to be drawn through a reading head, a pinch roller presses the tape against the tape drive wheel. When brakes are suddenly applied to the tape, rubbing of the tape drive wheel against the surface of the tape is prevented both because of the low inertia of the tape drive wheel and because the slip clutch is designed so the frictional resistance between the rubbing surfaces of the slip clutch is less than the frictional resistance between the surface of the tape drive wheel and the tape. This arrangement permits the tape drive wheel to stop simultaneously with the tape so that slippage occurs only between the rubbing surfaces of the slip clutch.

This invention relates to a capstan and more particularly to a low inertia capstan for a tape reader.

*Brief summary*

The capstan of this invention comprises a rotatably mounted driving shaft. A low inertia tape driving wheel is associated with the driving shaft. A slip clutch, or other type of slip connection is connected between the driving shaft and the tape driving wheel. During operation, the tape is held against the periphery of the continuously rotating tape driving wheel by a pinch roller. In this way rotation of the tape driving wheel pulls the tape between the pinch roller and the periphery of the tape driving wheel. The frictional resistance between the frictional rubbing surfaces of the slip clutch is selected so that when brakes are suddenly applied to the tape, the tape driving wheel, which has a low inertia, stops simultaneously with the tape, while slippage due to rotation of the driving shaft occurs only between the rubbing surfaces of the slip clutch. In this way wear and tear on the tape is avoided during high frequency stopping and starting.

*Background*

In a tape reader the tape is pulled through a reading head by means of a capstan. The capstan driven by a constant speed motor rotates continuously. When the tape is to be moved, a pinch roller, usually magnetically operated, squeezes the tape against the periphery of the capstan. When the tape is to be stopped, a brake, usually magnetically operated, is actuated and the pinch roller is simultaneously released.

When the capstan is used in a tape reader wherein the tape is stopped and started at a high frequency, often in excess of 150 times per minute, problems due to the rotation of the capstan and inertia-caused delay of the release of the pinch roller have caused wear and tear on the tape.

Heretofore attempts have been made to prevent these problems by designing the tape mechanism so the pinch roller is released prior to application of the brakes. The disadvantage of this arrangement is that while wear on the tape is reduced, the inertia of the pinch roller is such that the time delay in releasing the pinch roller imposes undesirable limits on the frequency of stop and start operation. Alternatively, attempts have been made to simply let the rubber drive of the capstan rotate against the tape for a brief period until the pinch roller is released. This, of course, was objectionable because the increase in the rate of stopping and starting was offset by the wear and tear on the tape.

What is needed therefore, and comprises an important part of this invention, is to provide a capstan which permits the tape mechanism to be stopped and started as rapidly as desired without causing wear and tear on the tapes.

This, and other objects of this invention, will become more apparent when understood in a light of the specifications and accompanying drawings, wherein.

Figures 1, 2:
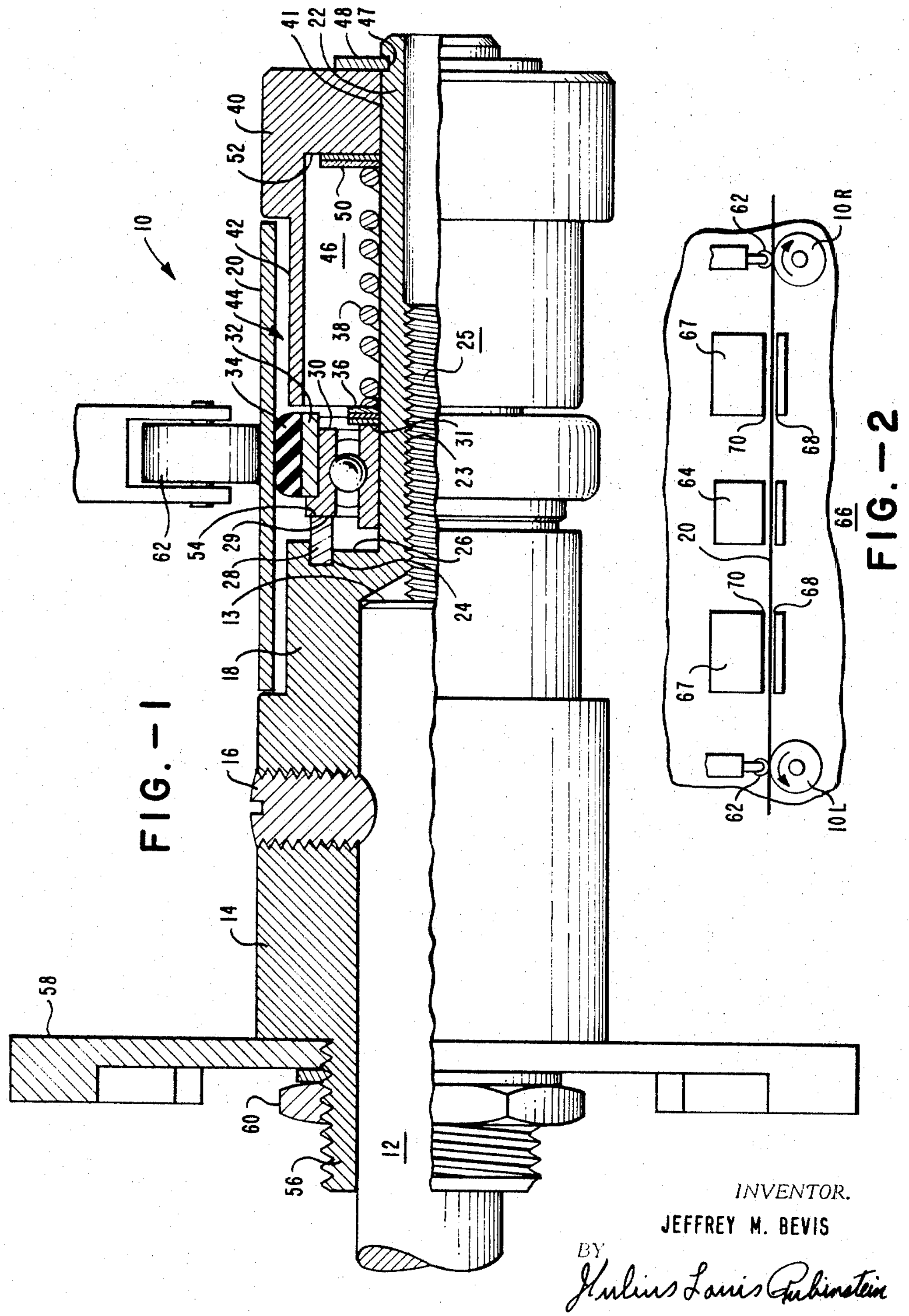
FIG. 1 is a side elevational view, partially in section, showing the structure of the capstan and showing the pinch roller forcing the tape against a rubber drive.
FIG. 2 is a diagrammatic view of a portion of a tape reader showing the arrangement of the capstans and pinch rollers in relation to the reading head and the brakes.

Referring now to FIG. 1 of the drawing, a capstan constructed according to the principles of this invention and indicated generally by the reference numeral 10, comprises a drive shaft 12 connected to a constant speed motor (not shown). The drive shaft rotates continuously when in use. In the particular embodiment shown, a sleeve 14 covers shaft 12 and is connected thereto by a set screw 16 so that the sleeve 14 and the shaft 12 rotate simultaneously. The sleeve 14, which in this embodiment also serves as the drive shaft, is reduced at end 18 to form a portion of a groove in which the tape 20 will ride.

The reduced end 18 of sleeve 14 is further reduced to form a tubular support stem 22. The support stem is internally threaded at 23 for reasons to become apparent below. A bearing receiving groove 24 is formed in wall 26 at the base of stem 22. A bearing 28 formed from graphite bronze, or other suitable material, is rigidly mounted in groove 24. This bearing has a friction or clutch surface 29.

A ball or roller bearing 30 is mounted on stem 22. The outer surface of this bearing acts as a support for an aluminum adapter ring 32. An elastomeric material is bonded to the outer surface of the adapter ring to form a rubber-like tape driving wheel 34. Alternatively, the tape drive wheel may be formed from any material with a suitable frictional surface.

A plurality of thin spacer washers 36 are fitted over the support stem 22 and are adapted to engage the side 31 of the ball bearing 30, see FIG. 1. A coil spring 38 fits over the support stem 22 so that the spacer washers 36 are between the side 31 of the roller bearing 30 and spring 38.

A cup-shaped cover sleeve 40 is provided in the particular embodiment shown. This cover sleeve has a bore 41 extending therethrough sized to slidingly receive the support stem 22. The cup-shaped cover is mounted on the support stem with the mouth of the cup embracing the stem portion and facing the reduced portion 18 on the drive shaft. The outer surface of the cup-shaped cover sleeve is reduced at 42 to form, in cooperation with end 18, a groove 44 sized to receive the tape 20. The cup-shaped cover sleeve 40 is counter-bored to provide a recess 46 for receiving a portion of the support stem 22 of sleeve 14 and the coil spring 38.

The outer end of the support stem 22 is provided with a snap-ring receiving groove 47 for receiving snap-ring 48. With this arrangement the cover 40 is held on the stem 22.

As seen in FIG. 1, the coil spring 38 is compressed between spacer-washers 50 on the base 52 of the recess 46 and the spacer-washers 36. With this arrangement the coil spring 38 exerts pressure against the side of the inner race 31 of ball bearing 30. This in turn forces the clutch surface 54 of bearing 30 against the friction clutch surface 29 of bearing 28 to form a slip clutch. Furthermore, the magnitude of this biasing force exerted by the coil spring 38 can be adjusted as desired by simply changing the number of spacer-washers 36.

The end of sleeve 14, remote from stem 22, is also reduced to form a threaded boss 56. Fan blades 58 are fitted on boss 56 and are locked on the boss by means of a lock-nut 60. In this way, operation of the capstan causes the fan blades to rotate. This causes a stream of air to blow over the tape 20 and parts of the capstan 10 to keep them cool.

The capstan is used as follows:

A tape reader 64 of a desired type is mounted on a support 66. Magnetically actuated brakes 67 are positioned on the left and right sides of the tape reader, see FIG. 2. The brakes are conventional in design and comprise spaced braking or clamping portions 68 and 70 with the tape 20 movable between them. When the solenoids in the brake (not shown) are energized, the clamping portion 68 is pulled tightly against the clamping portion 70 of the brakes to clamp the tape between them. This causes the tape movement to stop abruptly. However, the drive shaft continues to rotate. Since, however, the tape driving wheel 34 is connected to the drive shaft through a low friction slip clutch, as described above, slippage occurs only between the clutch surfaces 29 and 54 of the slip clutch.

The frictional force between the clutch surfaces 29 and 54 is adjusted by a judicious use of the spacer-washers 36, or by other suitable means, so it is lower than the frictional force between the tape driving wheel 34 and the tape. This is possible because the inertia of the tape driving wheel is low. In this way, as stated above, when the tape abruptly stops the tape driving wheel 34 stops simultaneously while slippage occurs harmlessly between the clutch surfaces 29 and 54. Consequently, the capstan described above can be used in a tape reader wherein the tape is stopped and started at a very high frequency.

A positioning bolt 25 is inserted inside the tubular support stem 22 in threaded engagement with the threads 23. This bolt is rotated inside the support stem 22 until the end of the bolt abuts against the end 13 of shaft 12. With this arrangement, when the capstan needs to be adjusted or repaired, the set screw 16 is simply loosened and the sleeve 14 is removed as a unit from shaft 12. After the repairs or adjustments are made, the sleeve is then simply slipped back over the end of shaft 12 until the bolt 25 abuts against the end 13 of shaft 12. With this arrangement the position of the tape driving wheel will be lined up with the pinch roller 34.

Obviously many modifications and variations of the present invention are possible in the light of the above teachings. It is therefore to be understood that within the scope of the appended claims the invention can be practiced otherwise than as specifically described.

What is claimed is:

1. A capstan for high frequency stop and start operation comprising a rotatably mounted driving shaft, a low inertia tape driving wheel associated with said driving shaft, a slip connection between said driving shaft and said tape driving wheel, said tape driving wheel adapted to have tape held against its periphery by a pinch roller whereby operation of the tape driving shaft causes the tape driving wheel to rotate and pull tape between the pinch roller and the periphery of the tape driving wheel, the resistance in the slip connection between said driving shaft and said tape driving wheel determined so that when brakes are applied to the tape, the low inertia tape driving wheel stops simultaneously with the tape while slippage occurs only at the slip connection whereby because of the low inertia of the tape driving wheel wear and tear on the tape is avoided during high frequency stop and start operation.

2. A capstan of the class described comprising a rotatably mounted shaft, a low inertia tape driving wheel freely rotatably mounted on the shaft and concentric therewith, friction means mounted on said shaft and bearing against said tape driving wheel whereby rotation of said shaft causes said tape driving wheel to rotate therewith, said tape driving wheel adapted to have tape held against its periphery by a pinch roller whereby operation of the tape driving shaft causes the tape driving wheel to rotate and pull tape between the pinch roller and the periphery of the tape driving wheel, the frictional resistance between said driving shaft and said tape driving wheel in said friction means such that when brakes are applied to the tape, the low inertial tape driving wheel stops with the tape while slippage occurs only at the friction means whereby wear and tear on the tape is avoided during high frequency stop and start operation.

3. The capstan described in claim 2 including means for adusting the frictional resistance between said tape driving wheel and said driving shaft.

4. The capstan described in claim 2 including a fan mounted on said shaft and rotatable therewith for cooling the capstan and the tape during high frequency stop and start operation.

5. The capstan described in claim 2 wherein said shaft is provided with a stem portion, a roller bearing mounted on the stem portion, a tape driving wheel mounted on the roller bearing whereby the tape driving wheel is freely rotatable on the stem portion, said stem portion having a base wall, a friction bearing mounted on the base wall, and biasing means on the shaft for biasing the side of the roller bearing against the friction bearing to form said friction means.

6. The capstan described in claim 5 wherein said biasing means comprises a coil spring, and means for varying the biasing force exerted by said coil spring whereby the friction engagement between the friction bearing is great enough to permit rapid starting of the tape driving wheel when the tape is to be started, but small enough so that when the brake is applied to the tape, the tape driving wheel stops simultaneously with the tape whereby slippage occurs only at the engagement of the slide of the roller bearing and the friction bearing.

7. The capstan described in claim 5 wherein a fan is mounted on the shaft and is rotatable therewith for cooling the capstan during high frequency stop and start operation.

8. A capstan of the class described comprising a shaft, said shaft having a reduced portion, said reduced portion further reduced to form a stem, a groove formed in the base wall of the stem, a friction bearing mounted in said groove, said friction bearing having a friction surface, a ball bearing mounted on said stem portion, a tape driving wheel mounted on said ball bearing, a coil spring mounted on the stem portion, one end of the coil spring adapted to exert pressure against a side of the inner race of the ball bearing to bias the ball bearing so a surface of the ball bearing rubs against the friction surface of the friction bearing to form a slip clutch, a cover mounted on the stem portion with the mouth of the cup embracing the stem portion and facing the first reduced portion, the opposite end of the coil spring bearing against the base of the cup shaped cover whereby the compression in the spring forces the ball bearing against the side of the friction bearing, the biasing force exerted by the coil spring on the ball bearing such that the frictional engagement on the rubbing surfaces of the slip clutch is great enough to permit rapid start of the tape driving wheel when the tape is started and small enough so that when a brake is applied to the tape the tape driving wheel stops with the tape whereby slippage occurs only at the slip clutch.

9. The capstan described in claim 8 including means for adjusting the biasing force exerted by the coil spring, said means comprising a plurality of spacer-washers adapted to be inserted over the stem between the coil spring and the side of the roller bearing whereby the compression in the spring may be varied by simply changing the number of spacer-washers.

10. The capstan described in claim 9 including a fan mounted on the shaft and rotatable therewith for cooling the capstan during high frequency stop and start operation.

11. A capstan of the class described comprising a rotatably mounted shaft, a low inertia tape driving wheel freely rotatably mounted on the shaft and concentric therewith, slip connection means mounted on said shaft and bearing against said tape driving wheel whereby rotation of said shaft causes said tape driving wheel to rotate therewith, said tape driving wheel adapted to have tape held against its periphery by a pinch roller whereby operation of a tape driving shaft causes the tape driving wheel to rotate and pull tape between the pinch roller and the periphery of the tape driving wheel, the resistance between said driving shaft and said tape driving wheel in said slip connection means such that when brakes are applied to the tape the low inertia tape driving wheel stops with the tape while slippage occurs only at the slip connection means whereby wear and tear on the tape is avoided during high frequency stop and start operation.

References Cited

UNITED STATES PATENTS 2,291,627 8/1942 Huck ------------ 226—188 X

ALLEN N. KNOWLES, *Primary Examiner.*

U.S. Cl. X.R.

226—181, 194